United States Patent
Hsiao et al.

(10) Patent No.: US 6,772,177 B2
(45) Date of Patent: Aug. 3, 2004

(54) SYSTEM AND METHOD FOR PARALLELIZING FILE ARCHIVAL AND RETRIEVAL

(75) Inventors: Hui-I Hsiao, Saratoga, CA (US); Kiran Mehta, San Jose, CA (US); Ajay Sood, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 09/872,088

(22) Filed: Jun. 1, 2001

(65) Prior Publication Data

US 2002/0184244 A1 Dec. 5, 2002

(51) Int. Cl.⁷ ............................................. G06F 17/30
(52) U.S. Cl. ........................................ 707/204; 707/8
(58) Field of Search ..................................... 707/204, 8

(56) References Cited

U.S. PATENT DOCUMENTS

| | | | | |
|---|---|---|---|---|
| 4,996,663 A | | 2/1991 | Nemes ........................ | 364/900 |
| 5,606,689 A | | 2/1997 | Nakagawa .................. | 395/622 |
| 5,668,897 A | * | 9/1997 | Stolfo ......................... | 382/283 |
| 5,671,350 A | * | 9/1997 | Wood .......................... | 714/15 |
| 5,673,381 A | | 9/1997 | Huai et al. .................. | 395/180 |
| 5,778,395 A | * | 7/1998 | Whiting et al. ............. | 707/204 |
| 5,797,016 A | * | 8/1998 | Chen et al. ................. | 717/171 |
| 5,893,086 A | | 4/1999 | Schmuck et al. ............. | 707/1 |
| 5,960,431 A | | 9/1999 | Choy ............................ | 707/7 |
| 5,987,462 A | | 11/1999 | Kasao et al. ................. | 707/10 |
| 6,366,987 B1 | * | 4/2002 | Tzelnic et al. .............. | 711/162 |
| 6,484,250 B1 | * | 11/2002 | Mei et al. ................... | 711/216 |

\* cited by examiner

*Primary Examiner*—Wayne Amsbury
*Assistant Examiner*—Cam Linh Nguyen
(74) *Attorney, Agent, or Firm*—Samuel A. Kassatly

(57) ABSTRACT

A database management system and associated methods for parallelizing file archival and retrieval in an extended database management system. The system includes a set of copy agents that selectively acquire the backup tasks from a copy queue, and a set of retrieval agents that selectively acquire the restore tasks from a restore queue. The chances of contention between any two copy agents or any two retrieve agents acquiring the same copy or restore task is significantly minimized. Once specific copy agents are assigned backup tasks, the backup process is implemented to determine the optimal way to write the backup files to one or more targets, in parallel. In addition, the present system enables the efficient and expeditious retrieval of the desired files without having to search all the targets.

17 Claims, 5 Drawing Sheets

SYSTEM AND METHOD FOR PARALLELIZING FILE ARCHIVAL AND RETRIEVAL

FIELD OF THE INVENTION

The present invention relates generally to database management systems for the storage of data objects, and particularly for the efficient management of access and control over data linked to a database system and stored remotely in a file system or another object repository. More specifically, the present invention relates to a system and associated method for parallelizing file or data archival and retrieval in an extended database management system.

BACKGROUND OF THE INVENTION

Data is typically maintained for storage and retrieval in computer file systems, wherein a file comprises a named collection of data. A file management system provides a means for accessing the data files, for managing such files and the storage space in which they are kept, and for ensuring data integrity so that files are kept intact and separate. Applications (software programs) access the data files through a file system interface, also referred to as the application program interface (API). However, management of computer data using file management systems can be difficult since such systems do not typically provide sufficient information on the characteristics of the files (information called metadata).

A database management system (DBMS) is a type of computerized record-keeping system that stores data according to a predetermined schema, such as the well-known relational database model that stores information as a collection of tables having interrelated columns and rows. A relational database management system (RDBMS) provides a user interface to store and retrieve the data, and provides a query methodology that permits table operations to be performed on the data. One such RDBMS is the Structured Query Language (SQL) interface.

In general, a DBMS performs well at managing data in terms of data record (table) definition, organization, and access control. A DBMS performs well at data management because a DBMS associates its data records with metadata that includes information about the storage location of a record, the configuration of the data in the record, and the contents of the record. A file management system or file system is used to store data on computer systems. In general, file systems store data in a hierarchical name space. Files are accessed, located, and referenced by their unique name in this hierarchical name space.

As part of its data management function, a DBMS performs many automatic backup and copying operations on its tables and records to ensure data integrity and recoverability. Backing up data has become an integral part of safe computing, and is not merely reserved for mission critical applications.

Current computer users rely heavily on sophisticated backup and recovery solutions to ensure data access and integrity. For desktop systems, backup can be implemented on numerous data storage systems including diskettes, hard drives, magnetic tapes, optical drives, CDRs (writable compact disks), CDRWs (re-writable compact disks), or high capacity removable magnetic media. For networked computers, backup can span the network to larger drives on a file server, tape, or optical backup systems.

The following definitions and explanations provide background information pertaining to the technical field of the present invention, and are intended to facilitate the understanding of the present invention without limiting its scope:

A "Daemon" is an acronym for "Disk And Execution MONitor". It is a program that is not invoked explicitly, but lies dormant waiting for some condition(s) to occur. In other words, it is a process that is constantly running on a computer system to service a specific set of requests. In UNIX, for example, lpd is a daemon that manages printing requests. Daemons are self-governing functions. Although they are not part of an application program, daemons may service application requests.

An "agent" is an independent program or process that executes one or more tasks (such as information gathering from Networks, DataBases, or the Internet), providing services for application programs or acting as a principal. In general, the term "Daemon" refers to a persistent agent that has a very long life, whereas an agent refers to a process that has either a short file or a long life. However, for the purpose of simplification, the following description uses the terms agent and Daemon interchangeably.

A "Copy Daemon" is also referred to herein as "copy agent", and represents a process that performs the task of archiving a file.

A "Retrieve Daemon" is also referred to herein as "retrieve agent", and represents a process that performs the task of retrieving or recovering a file.

"Hashing" is a method for delivering high-speed, direct access to a particular stored data based on a given value for some field. Usually, but not necessarily, the field is a key. The following is a brief description of a typical hashing operation:

Each data record is located in a database whose hash value is calculated by a hash function of a selected field from that record (called a hash field). In order to store a record, the DBMS computes the hash value and instructs a file manager to place the record at a specific location corresponding to the calculated hash value. Given a hash field, the DBMS can retrieve the record by an inverse computation on the hash fields.

The hashing operation presents certain characteristics, among which are the following:

1. Multiple distinct records may be mapped to a single hash value; and
2. As the hash table increases in size, the number of records mapped to the same value decreases (when the number of hash table entries increases, the number of records mapped to the same value decreases. On the other hand, when the number of records increases, there will be more records mapped to a hash value/entry.

Current technology such as DataLinks, backs up files, sequentially, one file at a time, which might not meet the demand of a large database, especially with the occurrence of a large number of concurrent transactions/users and/or a large number of files being updated per transaction. Typically, an updated file is not accessible by the users (other than the user updating the file) for further update or processing, until the backup operation of the file is completed. Therefore, a database or table space level backup operation cannot be completed until all the file backup operations are completed. Hence, serializing the file backup operation could adversely affect the overall DBMS performance.

It would therefore be desirable to effectively parallelize the backup operations while avoiding contentions between backup/copy agents, and to further enable the read back operation without searching all the backup targets where the files are stored.

SUMMARY OF THE INVENTION

It is one feature of the present invention to present a system and associated method for parallelizing file or data archival and retrieval in an extended database management system that satisfy this need. More specifically, the system includes a set of agents that selectively acquire the backup tasks from a queue. The chance of overlap between any two agents acquiring the same task is significantly minimized.

Once a specific copy agent is assigned the backup task, a backup process is implemented to determine the optimal way to write the backup file to a target, while avoiding write contention between two copy agents. This is in contrast to conventional backup methods according to which a single copy agent implements the backup operation sequentially, one file at a time.

In addition, subsequent to the backup operation, a need may arise to restore or retrieve the stored file. While in conventional systems a restore agent searches all the targets to find the desired file, the present invention enables an efficient and expeditious retrieval of the desired file without having to search all the targets.

To this end, the system and method of the present invention parallelize the file copying or backup operations with no additional latch or lock overhead and with no or minimal disk I/O contention. In addition, it provides a mechanism for efficiently locating the backup copy of a file when recovery or restore of the file is needed.

As an exemplary specific implementation, at a database manager or Datalink File Manager (DLFM) startup time, n Copy Daemons (or copy agents) are activated where n is a user configurable parameter. The n Copy Daemons acquire the task from a common queue. To avoid the need of latch and unlatch for every access to the common queue, the present invention assigns work to the Copy Daemon using a hash function. The hash function generates a hash value based on a file name. The hash value ranges from 0 to m−1, where m is much greater than n (m>>n).

The m hash values are grouped into K bins, where K is greater than or equal to n (K>=n), in a round robin manner. Each of the K bins is assigned to a Copy Daemon. When a Copy Daemon reads a file name from the common queue, it applies the hash function to the file name to obtain a hash value. After computing the hash value, mapping of the hash value to the bin is performed. The Copy Daemon will backup the file only if the hash value maps to a bin that is assigned to it. As a result of the above calculations if it is decided that the copy daemon should backup the file, then the file name is archived and removed from the common queue. Otherwise, the Copy Daemon skips the file and moves to the next file in the queue.

According to the present invention, files are first hashed to generate hash values that are then grouped into "bins". A Copy Daemon is responsible for one or more bins but a bin is always assigned to exactly one Copy Daemon. This enables multiple Copy Daemons to implement file backups concurrently without any contention on the bins.

In addition, to achieve optimal I/O parallelism with no disk contention, bins could be mapped to disk arms. By mapping Copy Daemons to bins and bins to disk arms, I/O contention from different Copy Daemons at the disks is also avoided.

The action of bringing a file into database control is termed "linking the file". Linking results from either an SQL insert operation or the database Load utility. When a file is "linked", a referential constraint is maintained between the file and the database record that references the file. An SQL insert statement could insert multiple records into a database table, which could result in linking of multiple files. An entry is also inserted into the archive table, which acts as a persistent common queue for all Copy Daemons. The common queue is sorted by the time at which the file is linked to the database. Copy Daemons do an uncommitted read from the archive table to avoid any latch or lock contentions.

Though the present invention has been summarized with reference to a specific exemplary implementation, e.g. DataLinks technology, it should be clear that the present invention is similarly applicable to other systems that perform data archival and/or retrieval.

Briefly, the present invention achieves a method to maximize throughput and to minimize contention (i.e., conflict) among agents as they are storing data into targets.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE PREFERRED EMBODIMENTS

Figure 1:
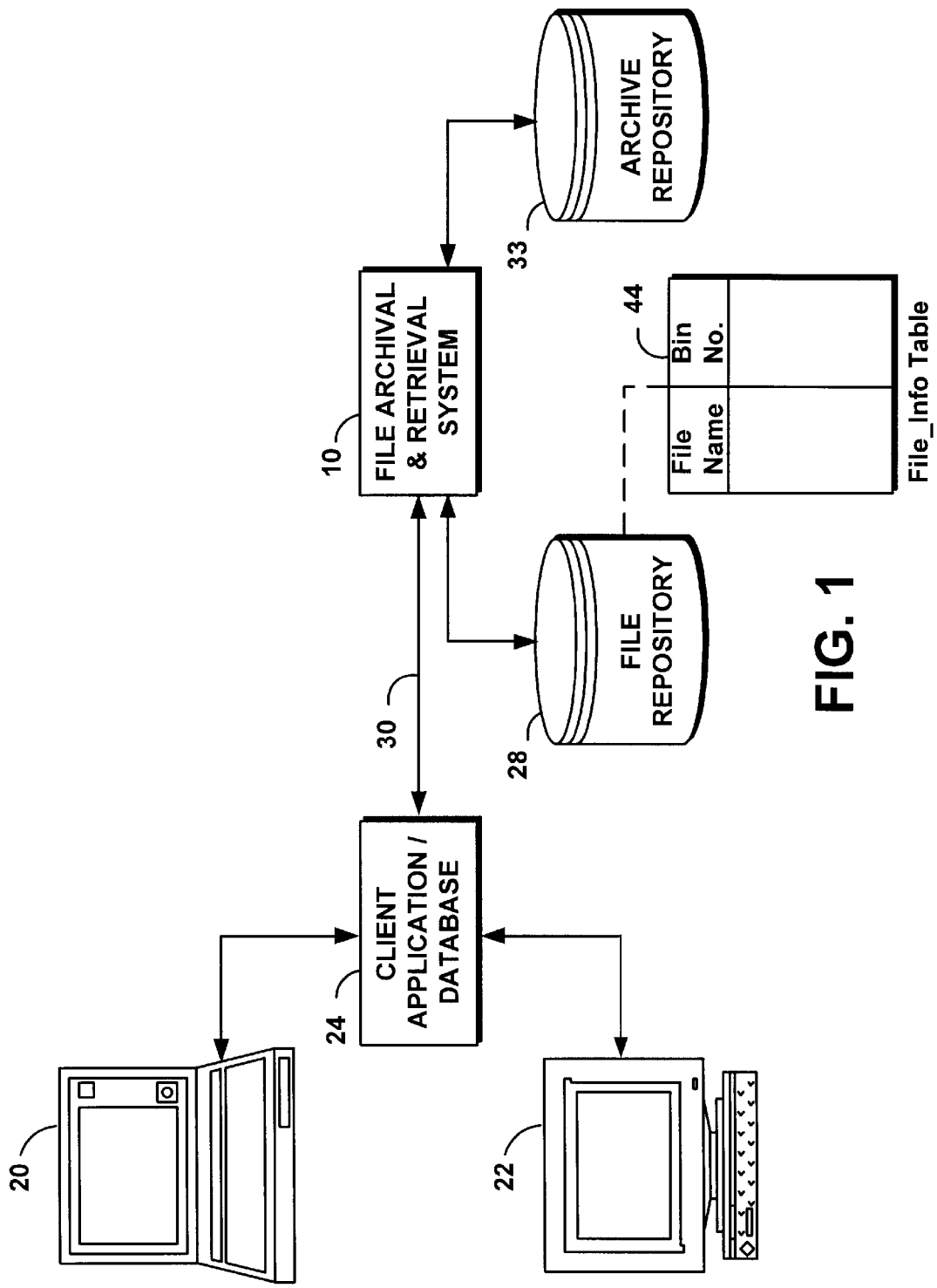
FIG. 1 is a block diagram representation of a file archival and retrieval system of the present invention.

FIG. 1 is a block diagram representation of a file archival and retrieval system 10 of the present invention. In one embodiment of the system 10, a client or user, represented by a computer 20, uses a client application 24 to issue a request to archive a file. The client application database, in turn, sends a request to the system 10 to backup the file in a file repository 28, and to subsequently archive this file in an archive repository 33 according to the present invention.

At some future point in time, the same user 20, or another user represented by a remote or networked computer 22, may wish to retrieve the stored file by means of the client application/database 24 over a file communication path 30. To this end, the user 20 or 22 issues a retrieve command to the client application 24. The client application database, in turn, sends a request to the system 10 to restore the file from the archive repository 33 and to save it in the file repository 28. While only two users 20, 22 are illustrated, it should be clear that many more users could access and use the system 10 either separately or concurrently.

Figure 2:
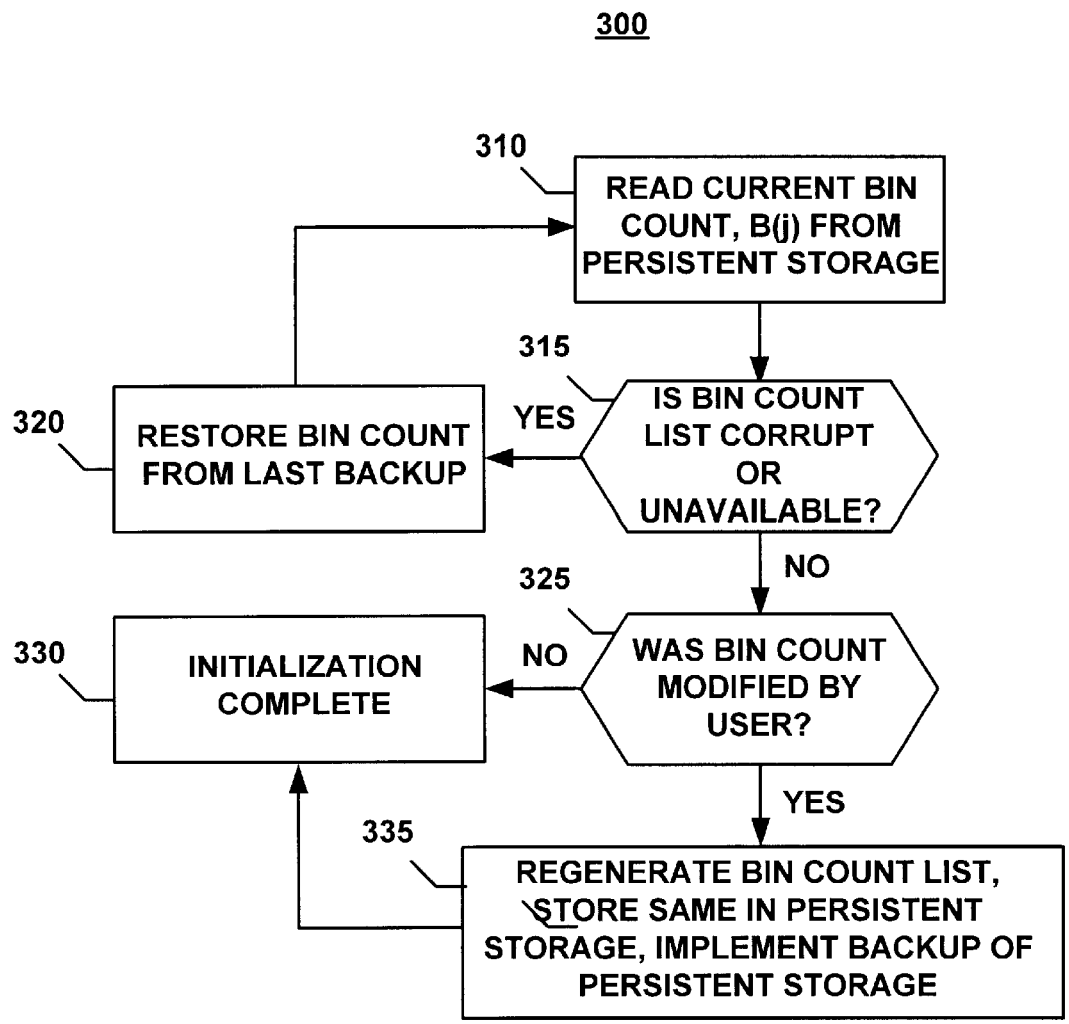
FIG. 2 is a process flow chart that illustrates the initialization method for a backup operation as implemented by the file archival and retrieval system of FIG. 1.
Figure 3:
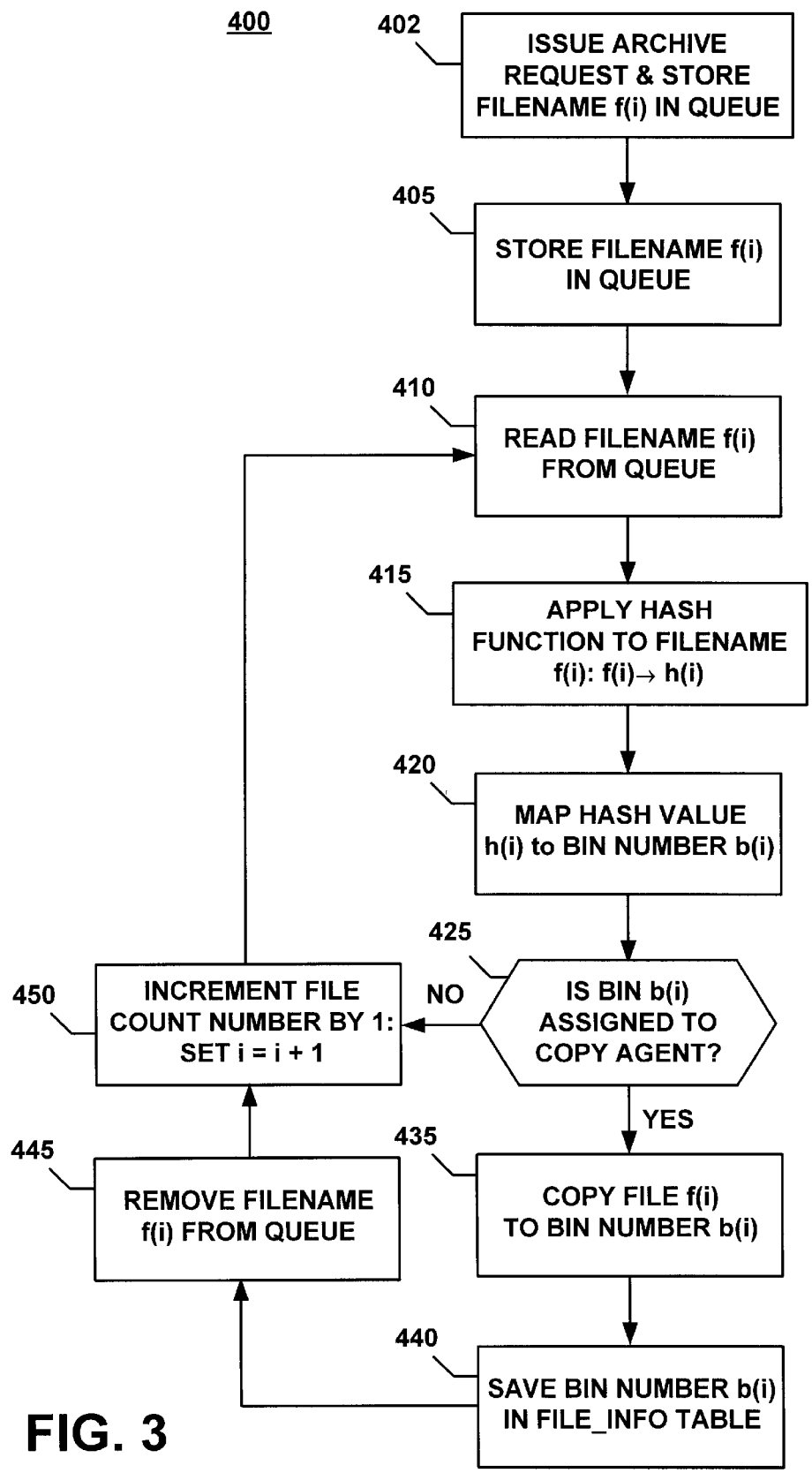
FIG. 3 is a process flow chart that illustrates a backup operation as implemented by the file archival and retrieval system of FIG. 1.

Having accessed the desired file or files, the user 20 can selectively perform any one or more of the following operations by means of the system 10, as it will be described later in greater detail:

File initialization and backup operations 300, 400 of FIGS. 2 and 3, respectively.

File retrieve or restore operation 500 of FIG. 4.

FIG. 2 is a process flow chart that illustrates an initialization process 300 for a back-up operation, according to the present invention. The initialization process 300 enables the system 10 to compute the hash value for use in the backup process 400 and the restore process 500.

The initialization process 300 starts at step 310 by reading the current bin count, B(j), from the bin count list which is typically stored in the file repository 28 with a backup copy in archive repository 33. The system 10 allows for a dynamic change of the number of bins, such as by expanding the number of bins over a long period of time. As used herein, the bin count list is a sequential list of the number of bins from the initial installation of the system 10 up to the present. An exemplary bin count list could appear as follows: 2, 4, 8, 10, 20, where the number 2 represents the number of bins at the time the system 10 was installed, and the number 20 represents the number of bins at the present time.

At decision block 315, the process 300 checks whether the bin count list is legible, corrupt, or unavailable. If the bin count list does not pass this integrity test, the process 300 proceeds to step 320, where it refreshes the bin count list from the last saved list in the archive repository 33.

Otherwise, if the bin count list is readable, the process 300 proceeds to decision step 325 and inquires whether the bin count has been modified by the user. If it has not, the process 300 proceeds to block 330 and terminates the initialization operation. However, in the event of any user modification to the bin count at step 325, the bin count list is regenerated at step 335 and a copy of the regenerated bin count list in the stored in the persistent storage 28 and a backup is made to the archive repository 33.

FIG. 3 illustrates the parallel backup process 400 of the present invention for archiving files from the on-line file repository 28 to the archive repository 33 (FIG. 1). Process 400 starts at block 402 when a user enters an "archive" request to store or archive the desired file with a file name with a filename value of f(i). This request causes the filename to be stored in a copy queue. While a preferred embodiment is described herein as using a single queue, it should be clear that two or more queues could alternatively be used. At step 405, the process 400 instructs the system 10 to initiate a backup of the file system contents. Each copy Daemon is independent and schedules itself to initiate the process of backup of the file.

Only the names of all the files from all the sources (i.e., user applications) that need to be archived or scheduled for archiving, are copied to the queue. The queue can be a shared memory, a persistent memory, or a database. By saving the filenames to the queue, the first of a plurality of available copy agents of the system 10 can now read the first filename at the head of the queue at step 410.

At step 415, the process 400 uses a hash function that inputs the filename values of the files to be archived, and generates hash values h(i) there from. As an illustration, the hash values h(i) vary from 0 to m−1.

At step 420, the process 400 uses a modulus operation to map the hash values h(i) to bin numbers b(i). As used herein, a bin number b(i) is the number of a logical bin where a file f(i) will be archived.

Process 400 then proceeds to decision block 425 and inquires if the copy agent that undertook the archiving task at step 410, is authorized to copy the file f(i) to the bin b(i) that has been mapped at step 420. For example, method 400 determines if the remainder value of the modulus operation matches the copy agent identification number.

If process 400 determines at step 425 that the copy agent is not authorized to copy the file f(i) to the bin b(i), it proceeds to step 450 where it increments the file count number by 1, and returns to step 410 where the copy agent reads the next filename in the queue, and repeats steps 415, 420, and 425, as described earlier. As a result, multiple copy agents will not undertake the task of archiving the same file f(i).

On the other hand, if process 400 determines at step 425 that the copy agent is authorized to copy the file f(i) to the bin b(i), the copy agent copies the content of file f(i) to bin number b(i) at step 435. Thereafter, at step 440, the bin number, b(i), along with the filename value f(i), are copied to the file_info table 44 (FIG. 1).

At step 445, and subsequent to the copy operation of step 440, the filename f(i) is deleted from the queue, and method 400 proceeds to step 450 to increment the file count and to continue as described earlier.

Figure 4A:
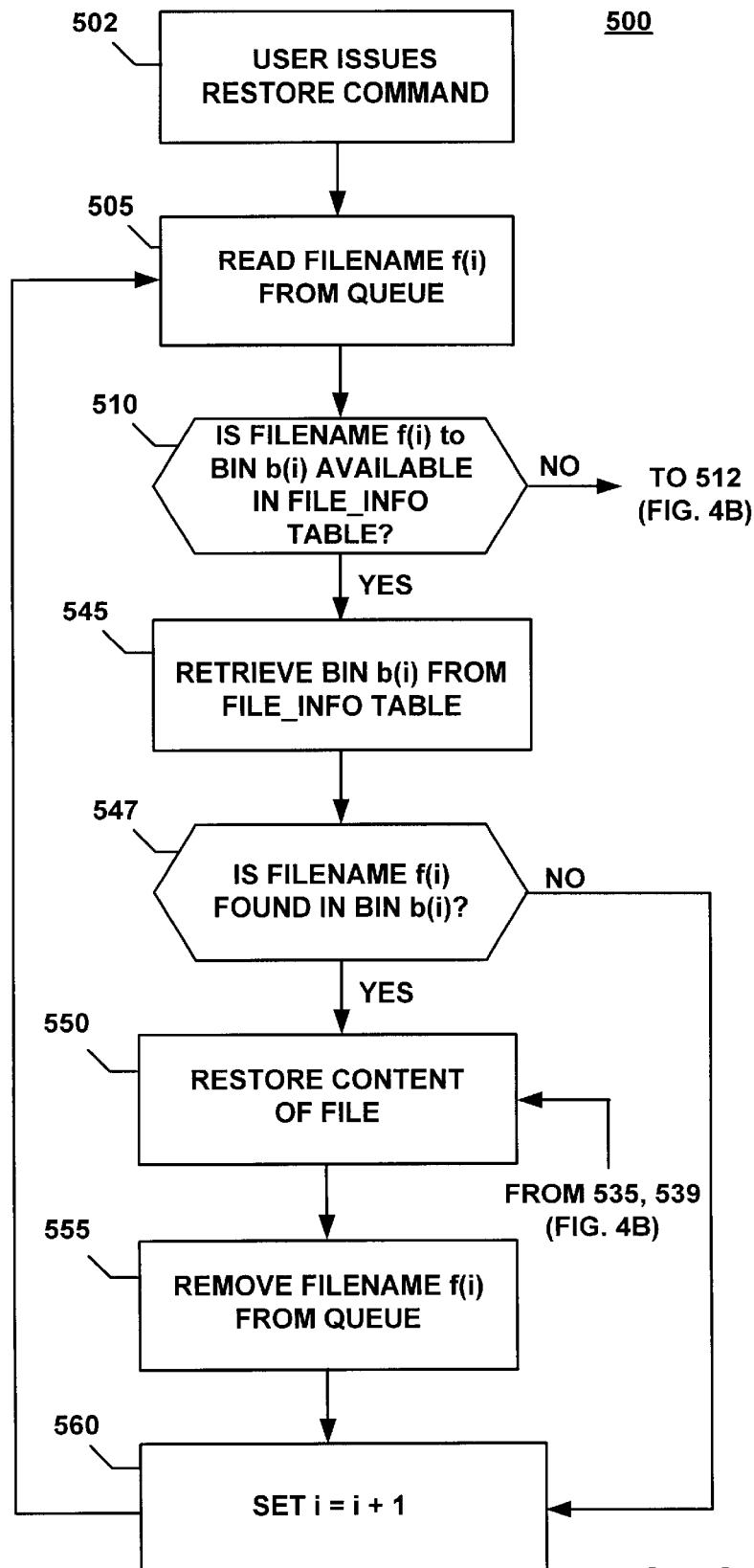
FIG. 4 is comprised of FIGS. 4A and 4B, and represents a process flow chart that illustrates a restore operation as implemented by the file archival and retrieval system of FIG. 1.
Figure 4B:
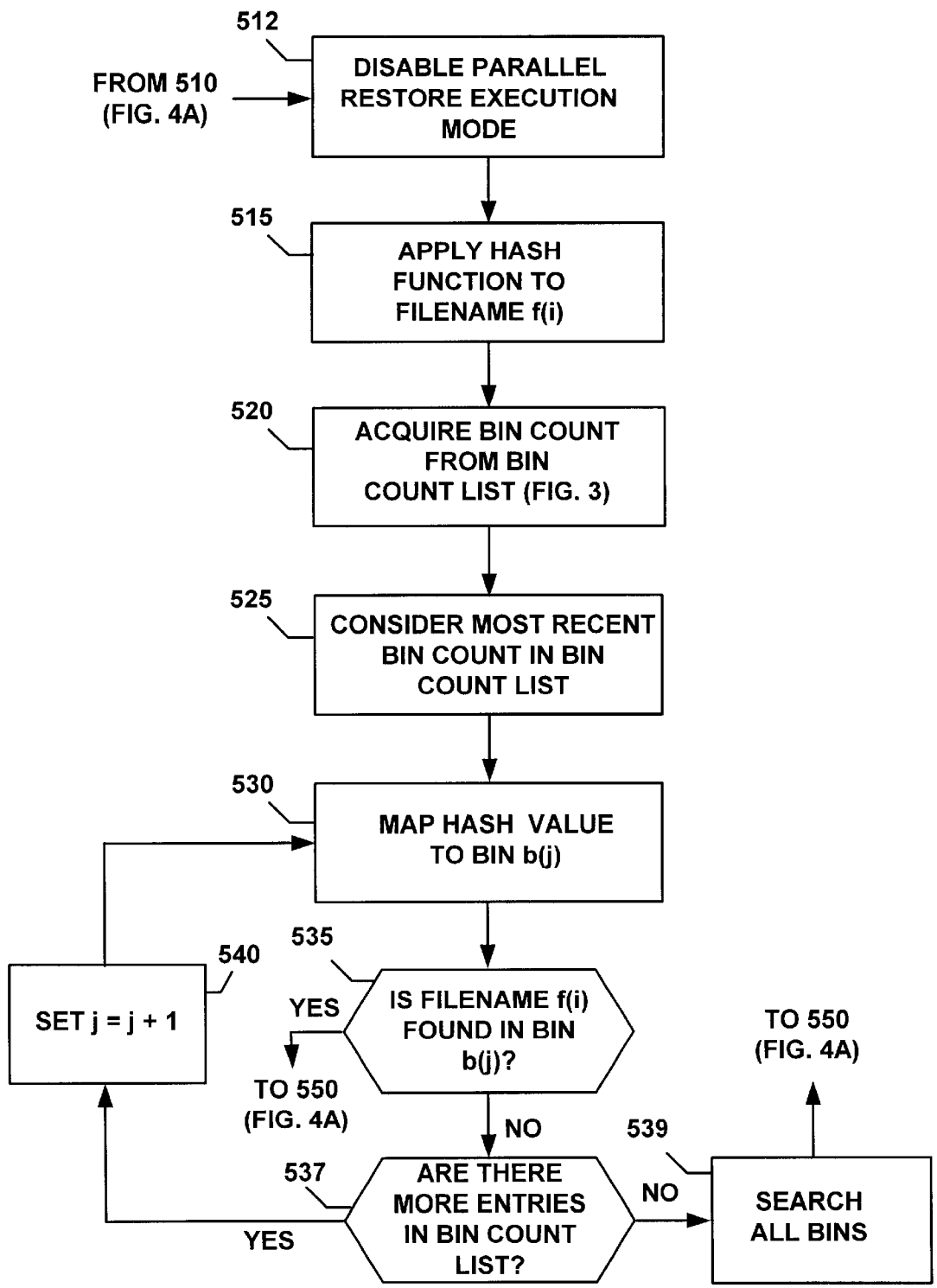

Turning now to FIG. 4, which is comprised of FIGS. 4A and 4B, it illustrates a flow chart for the implementation of a parallel file restore or retrieve process 500. Process 500 is initiated at step 502 by a "restore" command issued by the user. In response, the filename f(i) of the file or files to be restored is placed in a restore queue.

Whereupon, one of a plurality of retrieve agents of the system 10 reads the filename f(i) at the head of the queue at step 505. At step 510, the process 500 determines if filename f(i) to the bin number b(i) is available in the file_info table 44 of FIG. 1.

If such mapping is not available, such as if the file_info table 44 is corrupted, the process 500 proceeds to step 512 of FIG. 4B, and disables the parallel restore execution operation, so that one or optionally more dedicated restore agents will be assigned to retrieve the desired file or files.

Process 500 then proceeds to step 515 where it applies the hash function to the filename f(i). In a preferred embodiment, the hash function used in the restore process 500 is the same as the hash function used in the backup process 400.

At step 520, the process 500 acquires the bin count from the bin count list determined by the initialization process 300 of FIG. 2. At step 525, the process 500 considers the most recent bin count in the bin count list. In the example presented earlier, where the bin count list is as follows: 2, 4, 8, 10, 20, the process 500 selects the last bin count, 20.

Having obtained the most recent bin count, the process 500 proceeds to step 530 where it maps the hash value computed at step 515 to the bin number b(j) where the desired file is most likely to be stored.

At step 535, the process 500 determines if the file with the filename value f(i) is present in bin b(j) which was computed at step 530. If the file is present in bin b(j), the process 500 proceeds to step 550 of FIG. 4A, and retrieves the file content, and continues as it will be described later in connection with FIG. 4A Otherwise, if the file is not present in bin b(j), the process 500 proceeds to step 537 (FIG. 4B), and inquires if there exists any other entries in the bin count list. If no such entries exist, the process 500 proceeds to step 539 and searches all the bins for the desired filename f(i). This comprehensive search will reveal the desired file f(i), and the process 500 proceeds to step 550 to restore the file content and to continue as detailed below.

If, however, at step 537, the process 500 determines that there exists an additional entry in the bin count list, it increments the bin count by 1, and retrieves the next bin count from the list. In the above example, the next bin count is 10. Process 500 then proceeds to step 530 and repeats steps 535, 537, 539, and 540, as described above.

Returning now to step 510 of FIG. 4A, if the process 500 determines that the filename f(i) to the bin number b(i) is available in the file_info table 44 of FIG. 1, it proceeds to step 545 where it retrieves the bin that corresponds to bin number b(i) from the file_info table 44. The process 500 then inquires, at step 547, if the filename f(i) is available in the retrieved bin, and if it is, process 500 restores the file content at step 550, and removes the filename f(i) from the restore queue. Process 500 then increments the file count by 1 at step 560, and then returns to step 505 and continues as described earlier.

If at step 547, the process 500 determines that the filename f(i) is not available in the retrieved bin, it reports an error and proceeds to step 560 and therefrom to step 505 as described above.

It is to be understood that the specific embodiments of the present invention that have been described are merely illustrative of certain applications of the principle of the present invention. Numerous modifications may be made to the system 10 and associated methods 300, 400, and 500 described herein without departing from the spirit and scope of the present invention. For example, while the present invention has been described in relation to a single user, it should be clear that more than one user can use the system 10 concurrently.

What is claimed is:

1. A method of parallelizing file archival in a database management system, comprising:

placing one or more backup tasks in a copy queue;

computing hash values for data records stored in a database of the database management system, using a hash function of a hash field;

mapping the hash values to a plurality of bins;

assigning backup tasks to a plurality of copy agents using the hash values, to avoid a latch and unlatch operation for every access to the copy queue;

wherein if a file is to be backed up, archiving a hash field associated with the file, and removing the hash field from the copy queue; and assigning a copy agent to one or more bins, while assigning each bin to exactly one copy agent, in order to enable multiple copy agents to selectively acquire the backup tasks from the copy queue, wherein the probability of contention between any two copy agents acquiring the same backup task is minimized.

2. The method according to claim 1, further comprising mapping the bins to a plurality of disk arms for minimizing I/O contention from different copy agents at the disk drives.

3. The method according to claim 1, further including the step of retrieving one or more files that have been backed up.

4. The method according to claim 3, wherein the step of retrieving the files includes using one or more retrieve agents.

5. The method according to claim 4, wherein the step of using one or more retrieve agents includes causing a single retrieve agent to perform a single restore task.

6. The method according to claim 1, wherein the step of placing one or more backup tasks in the copy queue includes listing only the names of a plurality of files to be archived in the copy queue.

7. The method according to claim 6, wherein the step of using the copy agents includes having one agent read a first filename of the copy queue.

8. The method according to claim 1, further including the step of inquiring if a copy agent that undertook the backup task is authorized to archive the file to a correspondingly mapped bin.

9. The method according to claim 8, wherein if the copy agent is authorized to archive the file to a designated bin, the copying the file content to the bin; and further storing the bin number and a filename of the file to a file_info table.

10. The method according to claim 1, further comprising:

placing one or more restore tasks in a restore queue; and using a plurality of retrieve agents for selectively acquiring the restore tasks from the restore queue, wherein the probability of contention between any two restore agents acquiring the same restore task is minimized.

11. The method according to claim 10, further including the step of having a single retrieve agent read a first filename of the restore queue.

12. The method according to claim 11, further including the step of mapping the filename to a bin number to determine if a filename to bin number map is available in a file_info table.

13. The method according to claim 12, wherein if the filename to bin number map is not available, disabling a parallel restore operation, so that one restore agent is assigned to retrieve the file.

14. The method according to claim 13, further including the step of applying a hash function to the filename.

15. The method according to claim 14, further including the step of mapping the hash value to a bin number where a desired file is most likely to be stored.

16. A system for parallelizing file archival in a database management system, comprising:

one or more backup tasks that are placed in a copy queue;

a database of the database management system computes hash values for stored data records, using a hash function of a hash field, wherein the hash values are grouped in a plurality of bins;

wherein backup tasks are assigned to a plurality of copy agents using the hash values, to avoid a latch and unlatch operation for every access to the copy queue;

wherein if a file is to be backed up, a hash field associated with the file is archived and removed from the copy queue; and wherein a copy agent is assigned to one or more bins, while each bin is assigned to exactly one copy agent, in order to enable multiple copy agents to selectively acquire the backup tasks from the copy queue, wherein the probability of contention between any two copy agents acquiring the same backup task is minimized.

17. The system according to claim 16, further comprising:

one or more restore tasks that are placed in a restore queue; and a plurality of retrieve agents that selectively acquire the restore tasks from the restore queue, wherein the probability of contention between any two restore agents acquiring the same restore task is minimized.

* * * * *